(12) United States Patent
Lambert et al.

(10) Patent No.: US 11,993,455 B2
(45) Date of Patent: May 28, 2024

(54) CHEMICAL STORAGE SYSTEM

(71) Applicant: Solaris Oilfield Site Services Operating LLC, Houston, TX (US)

(72) Inventors: Bryan Scott Lambert, The Woodlands, TX (US); Brian Lee Phillips, Brady, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 834 days.

(21) Appl. No.: 16/729,708

(22) Filed: Dec. 30, 2019

(65) Prior Publication Data

US 2020/0231378 A1    Jul. 23, 2020

Related U.S. Application Data

(60) Provisional application No. 62/795,885, filed on Jan. 23, 2019.

(51) Int. Cl.
| | | |
|---|---|---|
| *B01F 33/82* | (2022.01) |
| *B01F 23/50* | (2022.01) |
| *B01F 33/83* | (2022.01) |
| *B01F 35/221* | (2022.01) |
| *B65D 88/08* | (2006.01) |
| *B65D 90/00* | (2006.01) |
| *B65D 90/14* | (2006.01) |
| *B65D 90/30* | (2006.01) |
| *B65D 90/51* | (2019.01) |
| *B01F 101/50* | (2022.01) |
| *B08B 9/00* | (2006.01) |
| *G01F 1/00* | (2022.01) |

(52) U.S. Cl.
CPC .............. *B65D 90/51* (2019.02); *B01F 23/50* (2022.01); *B01F 33/831* (2022.01); *B01F 35/2217* (2022.01); *B65D 88/08* (2013.01); *B65D 90/0093* (2013.01); *B65D 90/14* (2013.01); *B65D 90/30* (2013.01); *B01F 2101/50* (2022.01); *B08B 9/00* (2013.01); *G01F 1/00* (2013.01)

(58) Field of Classification Search
CPC ..................................... B01F 33/821
USPC ..................... 366/152.6, 159.1, 177.1, 181.8
See application file for complete search history.

(56) References Cited

U.S. PATENT DOCUMENTS

| | | | |
|---|---|---|---|
| 8,444,312 B2 * | 5/2013 | Hagan | E21B 21/062 366/181.8 |
| 8,926,252 B2 | 1/2015 | McIver et al. | |
| 9,511,929 B2 * | 12/2016 | Oren | B65D 25/08 |
| 10,150,612 B2 | 12/2018 | Pham | |
| 2017/0021318 A1 * | 1/2017 | McIver | B65D 88/32 |
| 2018/0245739 A1 | 8/2018 | Vaughn | |
| 2019/0217258 A1 * | 7/2019 | Bishop | B01F 23/50 |

* cited by examiner

*Primary Examiner* — David L Sorkin

(74) *Attorney, Agent, or Firm* — MH2 TECHNOLOGY LAW GROUP, LLP

(57) ABSTRACT

Embodiments of the present invention include systems for storing large quantities of chemicals at a remote site. A controlled blending system balances the inflow of dry material and liquids into the blender based on a predetermined solid/fluid ratio. The blending system further balances the inflow and outflow of material from the blender.

9 Claims, 13 Drawing Sheets

CHEMICAL STORAGE SYSTEM

CROSS-REFERENCE TO RELATED APPLICATIONS

The present application claims priority under 35 U.S.C. 119(e) to U.S. Provisional Application 62/795,885, filed Jan. 23, 2019, which is hereby incorporated by reference in its entirety.

BACKGROUND OF THE INVENTION

Field of the Invention

The present invention relates to systems for storing large quantities of multiple chemical additives for use in the oil and natural gas mining and drilling industries at remote locations. In particular, the present invention relates to systems and methods for storing and using chemical additives and acids in fracking projects at remote locations.

DESCRIPTION OF THE RELATED ART

Granular materials, such as sand, and certain chemical are used in bulk quantities in a number of applications. For example, mining and drilling companies sometimes make use of a technique termed "hydraulic fracturing" to aid in the extraction of fossil fuels from well sites. Hydraulic fracturing is the propagation of fractures in a rock layer caused by the presence of a pressurized fluid. Hydraulic fractures form naturally, as in the case of veins or dikes, and are one means by which gas and petroleum from source rocks may migrate to reservoir rocks.

Fracking operations require storing large quantities of multiple chemical additives at remote locations. Currently, chemicals are stored at fracking locations in small tanks having a maximum capacity of 550 gallons or in isolated tanks with a maximum capacity of 6,100 gallons. Such tanks often require refilling of their contents to ensure there is an available supply of the needed chemicals onsite. This process can be both time and cost consuming, as trailer trucks, drivers, and additional tanks are needed to haul material to the sites.

Hydraulic fracturing, often performed in remote areas, uses large amounts of granular material and chemicals that must be shipped into the site. The large amount of granular material required in a fracking operation at a well site requires that these materials be stored close to the well site so that they may be used as needed. Usable storage space at well and drilling sites is frequently very limited due to the terrain at the well sites or other factors related to the inaccessibility of the sites. As a result, storage space for materials necessary for drilling and mining operations is often at a premium. Improving the efficiency and use of storage space at drilling and well sites can have important economic as well as practical benefits for drilling and mining operations.

Typically, tractor trailer rigs are used to transport these materials to well sites. If no or insufficient storage space is available at the well site, it is oftentimes necessary to store the materials in the same tractor trailer rigs that delivered the materials to the well site. This is an inefficient and frequently cost-prohibitive solution to the storage problem because the trailers must be parked until needed. This is costly because the drivers and their trucks are forced to waste valuable time out of service. Thus, the efficient storage of materials at oil and natural gas well sites is a critical factor in the successful implementation of fracking operations.

In addition, the storage of the volatile organics and acids that are often used in drilling operations can be complex because the chemicals may be noxious or otherwise toxic to humans and corrosive to the storage tanks, pumps, and the other equipment used. The storage tank itself must be properly prepared to handle such corrosives, especially in large volumes, for as long as possible, until the chemicals are needed.

There thus exists a need for an improved system of storing and handling chemicals in bulk at remote locations. Additionally, the storage tanks must be able to accommodate and maintain volatile and corrosive chemicals.

SUMMARY OF THE INVENTION

The present invention relates to systems for storing large quantities of chemicals. In particular, the present invention relates to storing and using large quantities of multiple chemical additives for use in the oil and natural gas mining and drilling industries at remote locations.

One embodiment of the present invention is a chemical storage system having an acid storage silo having an acid level monitor and an attached fume scrubber tank, wherein a volume of acidic solution stored in the acid storage silo is in fluid communication with a recirculation pump; a chemical storage silo containing two compartments, wherein each compartment has a chemical level monitor, a fill line, and a cleanup system; and a platform, wherein the acid storage silo and the chemical silo are vertically attached to the platform.

Other embodiments of the present invention include a chemical storage silo having two discrete storage compartments, wherein each compartment has a chemical level monitor and a cleaning mechanism for rinsing the inside of each compartment and/or an acid storage silo having an acid level monitor and an attached fume scrubber tank, wherein a volume of acidic solution stored in the acid storage silo is in fluid communication with a recirculation pump.

Another embodiment of the present invention includes a chemical storage container comprising: (a) a recirculation system including a recirculation pump and a recirculation line that goes from a bottom end of the storage container toward a top end of the storage container; (b) a high level warning system; (c) a leak detection system; and (d) a cleanup system.

Yet another embodiment of the present invention is an acid storage container comprising: (a) a recirculation system including a recirculation pump and a recirculation line that goes from a bottom end of the acid silo toward a top end of the acid silo; (b) a high level communications system; (c) a leak detection system; and (d) a fill line.

Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

BRIEF DESCRIPTION OF THE DRAWINGS

Appended FIGS. 1-11 depict certain non-limiting embodiments of the storage and blending system and related systems. The figures are not intended to limit the scope of the invention but, instead, are intended to provide depictions of specific embodiments, features and non-limiting characteristics of the systems described herein. The accompanying figures further illustrate the present invention. The components of an embodiment shown in the drawings are not necessarily drawn to scale, emphasis instead being placed upon clearly illustrating the principles of the present invention.

FIG. 1 depicts a side view of a chemical storage system.

FIG. 2 depicts a cross-sectional view of the silos shown in the chemical storage system of FIG. 1.

FIG. 3 depicts one embodiment of an acid storage silo.

FIG. 4 depicts one embodiment of a top end of one embodiment of an acid storage silo.

FIG. 5 depicts one embodiment of a bottom end of one embodiment of an acid storage silo.

FIG. 6 depicts another view of the bottom end of the acid storage silo shown in FIG. 5.

FIG. 7 depicts another view of the bottom end of the acid storage silo shown in FIG. 5.

FIG. 9 depicts one embodiment of a bottom end of one embodiment of a chemical storage container.

FIG. 10 is a schematic depiction of a storage and blending system.

FIG. 11 is a schematic depiction of a controlled blending system.

DESCRIPTION OF THE PREFERRED EMBODIMENTS

While the specification concludes with the claims particularly pointing and distinctly claiming the invention, it is believed that the present invention will be better understood from the following description. The present invention can comprise or consist essentially of the components of the present invention as well as other ingredients or elements described herein. As used herein, "comprising" means the elements recited, or their equivalent, plus any other element or elements which are not recited. The terms "having," "including," and "comprised of" are also to be construed as open ended unless the context suggests otherwise.

Furthermore as used herein, the term "about" refers to a +1-10% variation from the nominal value. It is to be understood that such a variation is always included in a given value provided herein, whether or not it is specifically referred to. All ranges recited herein include the endpoints, including those that recite a range "between" two values. Terms such as "about," "generally," "substantially," and the like are to be construed as modifying a term or value such that it is not an absolute. Such terms will be defined by the circumstances and the terms that they modify as those terms are understood by those of skilled in the art. This includes, at the very least, the degree of expected experimental error, technique error and instrument error for a given technique used to measure a value.

The present invention relates to systems for storing large quantities of chemicals using containers or silos. In particular, the present invention relates to storing large quantities of multiple chemicals, such as an acid or chemical additive for use in the oil and natural gas mining and drilling industries at remote locations.

Figure 1:
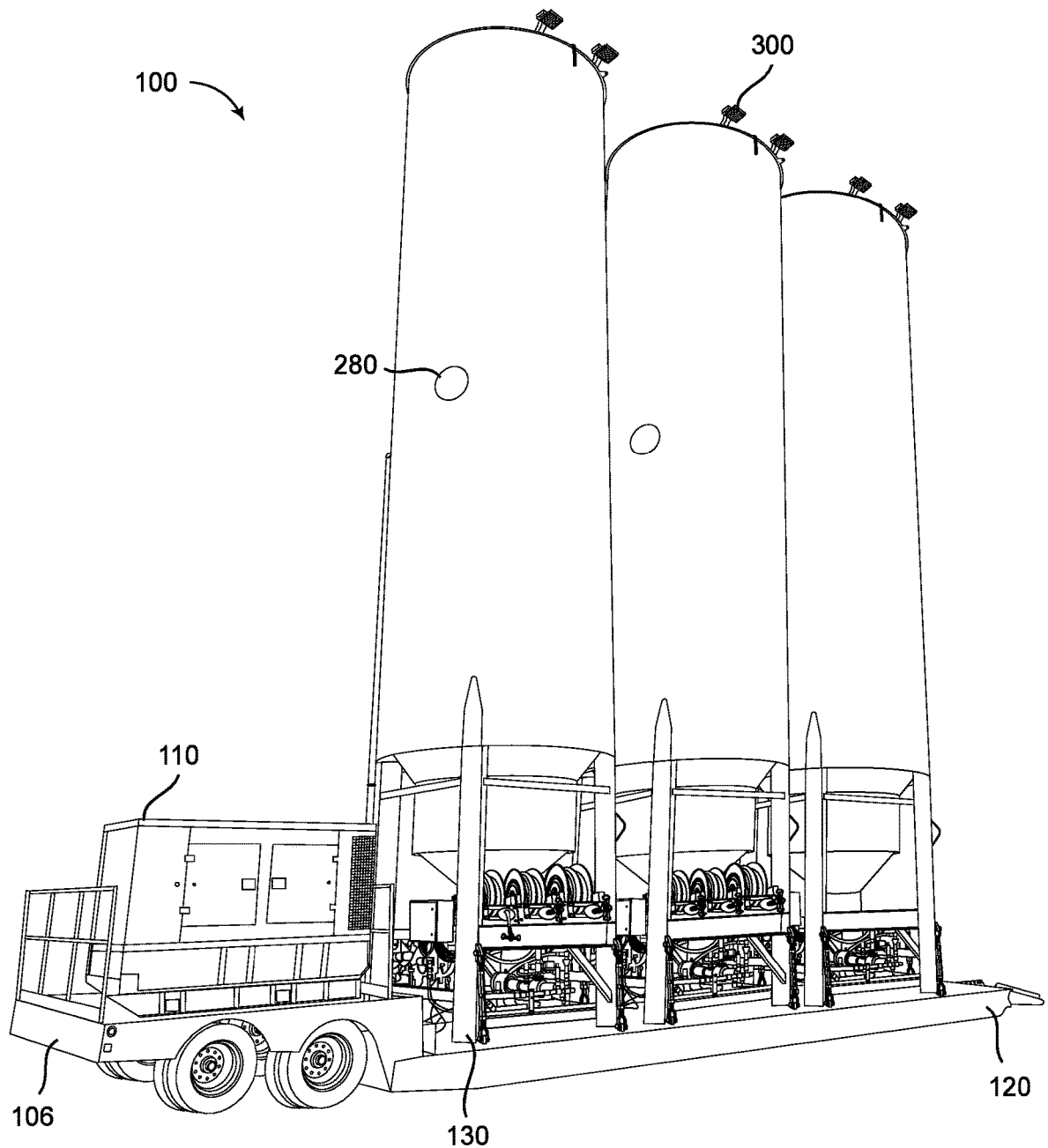

One embodiment of the chemical storage system as described herein is shown in FIG. 1. This embodiment includes vertically standing chemical storage containers for storing various chemicals and/or acids on-site.

The On-Site Chemical Storage System

One embodiment of an on-site modular storage system 100 includes a plurality of mobile storage containers 150 and/or 200, also referred to herein as silos, arranged on a base platform 120. The base platform 120 serves to stabilize any mixture of the silos 150 and/or 200 in the vertical position. Typically, one to three vertical free-standing silos may be positioned on a single base platform 120. The flat bottom base platform 120, allows a larger weight-bearing area on the ground resulting in lower ground pressure per unit weight of the silos.

FIG. 1 illustrates one embodiment of the on-site chemical/acid storage system 100. FIG. 1 shows a side view of a base platform 120 with three vertically standing silos with their legs 130 secured to the base platform 120. The platform 120 typically has an operational section 106 with an attached power generator 110. The base platform 120 has a set of wheels positioned under the operational section to allow the platform to be easily transported from one location to another as though it were a trailer by attaching it to a tractor for relocation. A power distribution center is included for distribution of power to the one to three silos positioned on the base platform.

Figure 2:
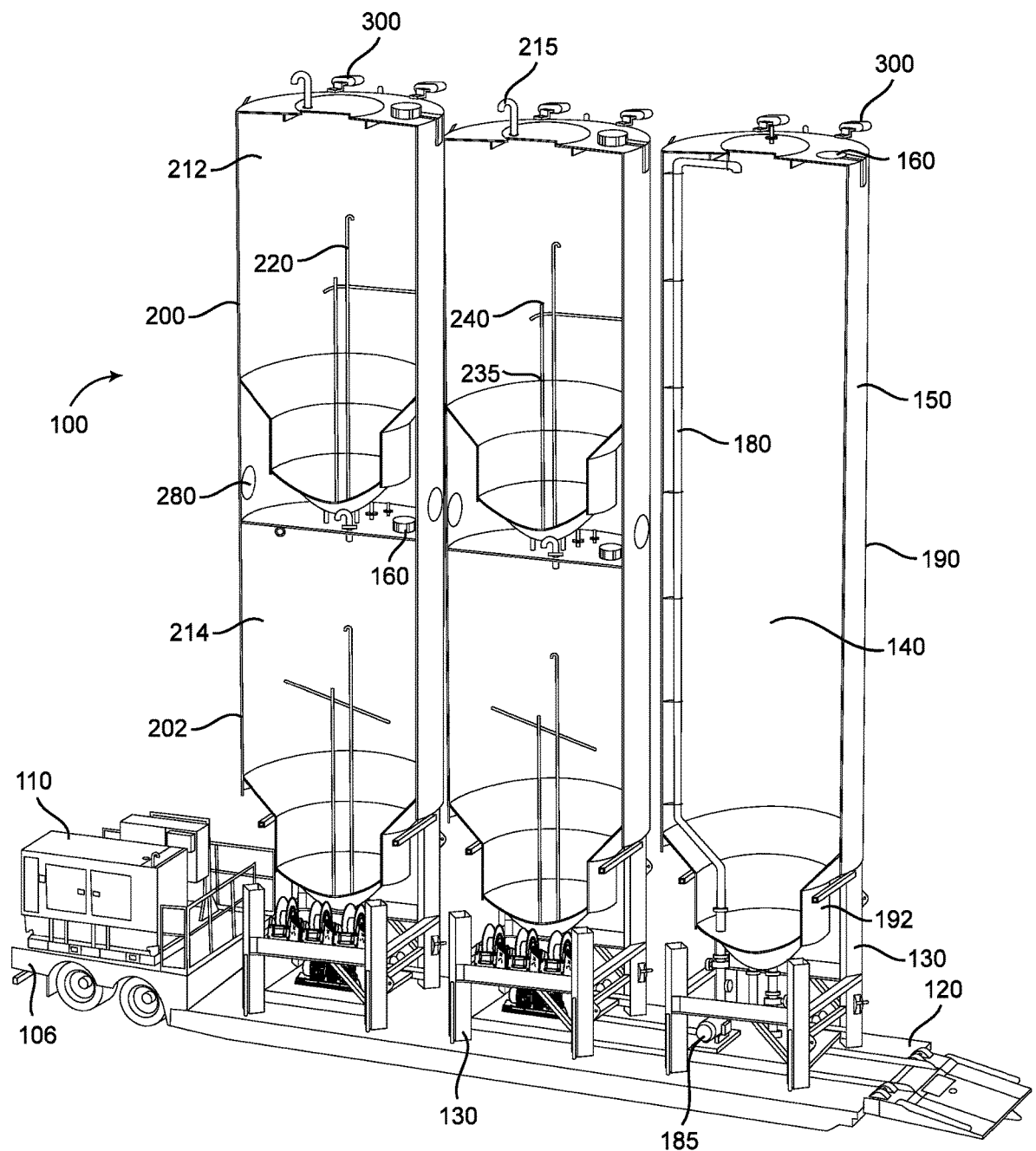

A preferred embodiment of the storage system 100, shown in FIG. 2, includes one acid storage silo 150, two chemical storage silos 200 (each chemical silo having two storage compartments 212, 214), and a base trailer or platform 120. However, any combination of chemical silos 200 and acid silos 150 can be attached to a platform. The system further comprises metering pumps, flow meters, hoses, hose reels, recirculation pumps, as well as all the necessary manifolds, controls, and equipment needed to operate the system. The system can store one to four different chemical additives and one acid solution.

Some embodiments of the storage system 100 will include lights 300 installed atop one or more of the silos 150 or 200. The lights will enable personnel to see in the nighttime and provide illumination for the site. In addition, the acid storage silo 150 and each compartment 212, 214 of the chemical storage silo 200 will generally include a manhole 160 that will provide access to the storage silos for maintenance purposes. In addition, there is typically at least one access opening 280 in the outer shell of the chemical silo to allow workmen to enter an area between the two storage compartments 212 and 214. This access opening 280 provides an entrance to the manhole of the lower storage compartment 214, as well as equipment mounted on top of the second compartment such as the vent pipe 215.

The various silos 150 and/or 200 are connected to a blender and the storage system 100 is in communication with a programmable blender control system to provide the controlled delivery of the stored chemical additives and/or a dilute acid from the storage system 100. For example, in the embodiment of the storage system illustrated in FIGS. 1 and 2 a dilute acid from the acid silo 150 and the four chemical additives from the chemical compartments 212, 214 can be delivered into the blender. Furthermore, one or more chemical silos 200 can be added to the system such that their compartments feed into the blender.

The storage system 100 illustrated in FIG. 1 has an acid storage silo 150 on the far right of the figure, this acid storage is designed for storing an acid solution such as a diluted hydrochloric or sulfuric acid. The other two silos 200 are designed for storing various chemical additives.

The Acid Storage Silo

Figure 3:
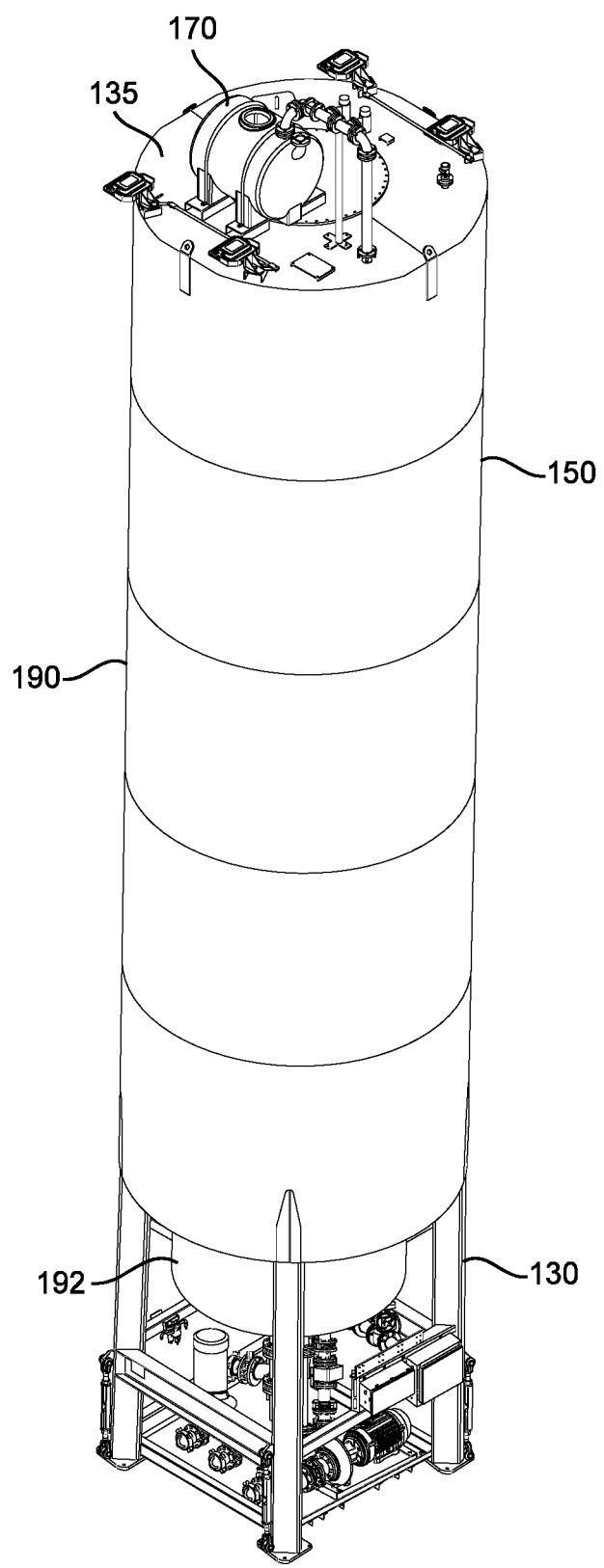

One example of an acid storage silo 150 is shown in FIGS. 2 and 3. The illustrated acid storage silo has a rounded body with a set of legs 130 mounted on a bottom end of the acid storage silo. The embodiment illustrated in FIG. 3 has a flat top and a tubular top segment 190 connecting to one or more rounded smaller sections 192 toward the bottom end of the silo. The legs are commonly attached to a platform 120 to stabilize the vertical positioning of the silo on the platform.

Preferred embodiments of the acid storage silo 150 will contain or store a diluted acid solution such as hydrochloric or sulfuric acid. The silo tank 140 is typically sized to hold between 25,000-40,000 gallons with one preferred embodiment sized to have a maximum capacity of 33,000 gallons.

The strong acids routinely used in the mining and drilling industries are very noxious and corrosive. To protect the interior of the silos, piping, flow meters, valves and other equipment that comes into contact with the acid solution, the equipment will be manufactured from or lined with acid resistant material. In addition, a corrosion inhibitor may be dissolved or suspended in the acid solution. To prevent any settling of the corrosion inhibitor from the acid solution, each acid storage silo 150 will be equipped with a recirculation pump 185 and a recirculation line 180 that goes from the bottom end of the acid tank 150 toward the top end of the tank. Constant recirculation of the acid solution is important to keep the corrosion inhibitor well mixed or suspended in the solution and to provide constant protection for any equipment in contact with the acid solution. A preferred embodiment of the recirculation pump is capable of recirculating the contents of the entire silo every hour.

If an acid silo is decommissioned, either temporarily or for transport to another project, the recirculation line 180 and the recirculation pump may be used to circulate a neutralizing fluid and/or water to rinse out the silo. The acid silo is then ready for reuse with either the same or a different solution. For example, if in one situation a dilute hydrochloric acid is used and when the silo is transported and used in another project to store a dilute sulfuric acid.

Figure 5:
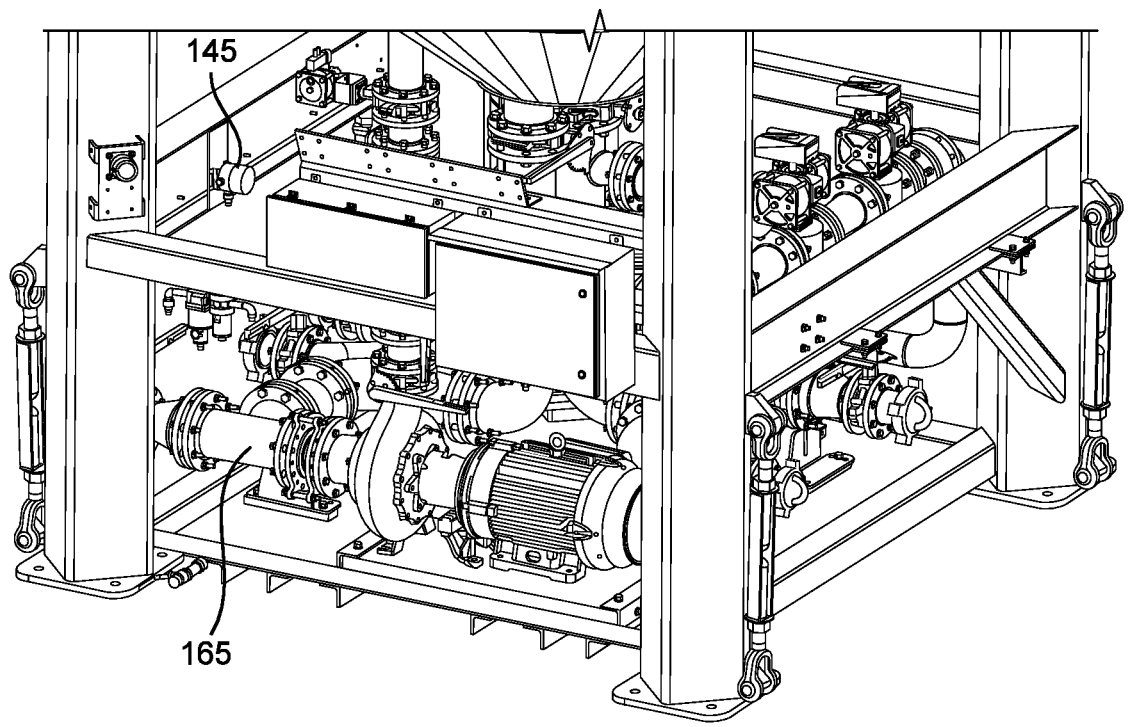

To protect the health of the workers and the professionals that work with and around the acid storage silo, a leak detection system and a spill prevention system are used in conjunction with the acid storage silo. The fumes from a caustic acid solution, such as a dilute hydrochloric or sulfuric acid solution, present a health hazard for the workers nearby. Thus a vapor detector 145, such as the one illustrated in FIG. 5, is in communication with an alarm to alert personnel of the presence of any escaped acid vapors. The vapor detector 145 is generally installed at the bottom of the acid storage silo 150 to detect leaks that may develop in the acid storage silo.

Figure 4:
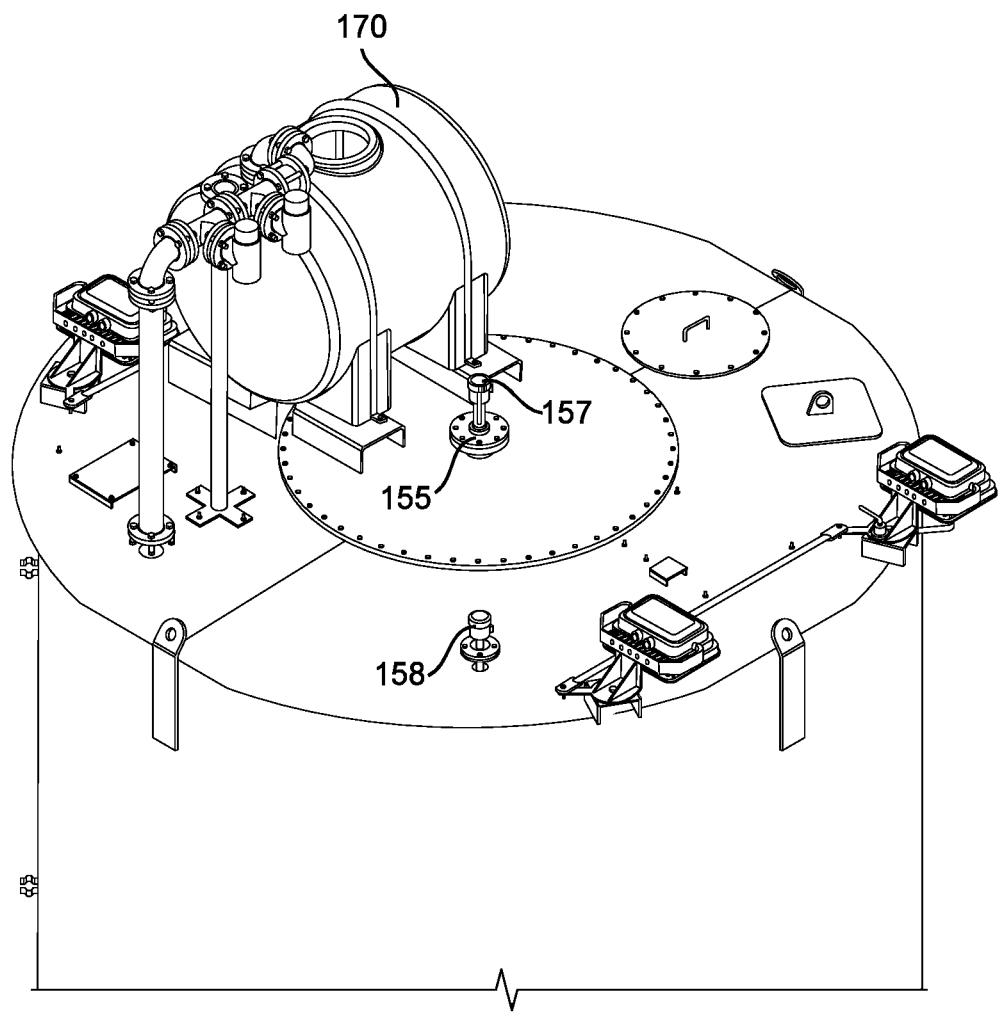
Figure 6:
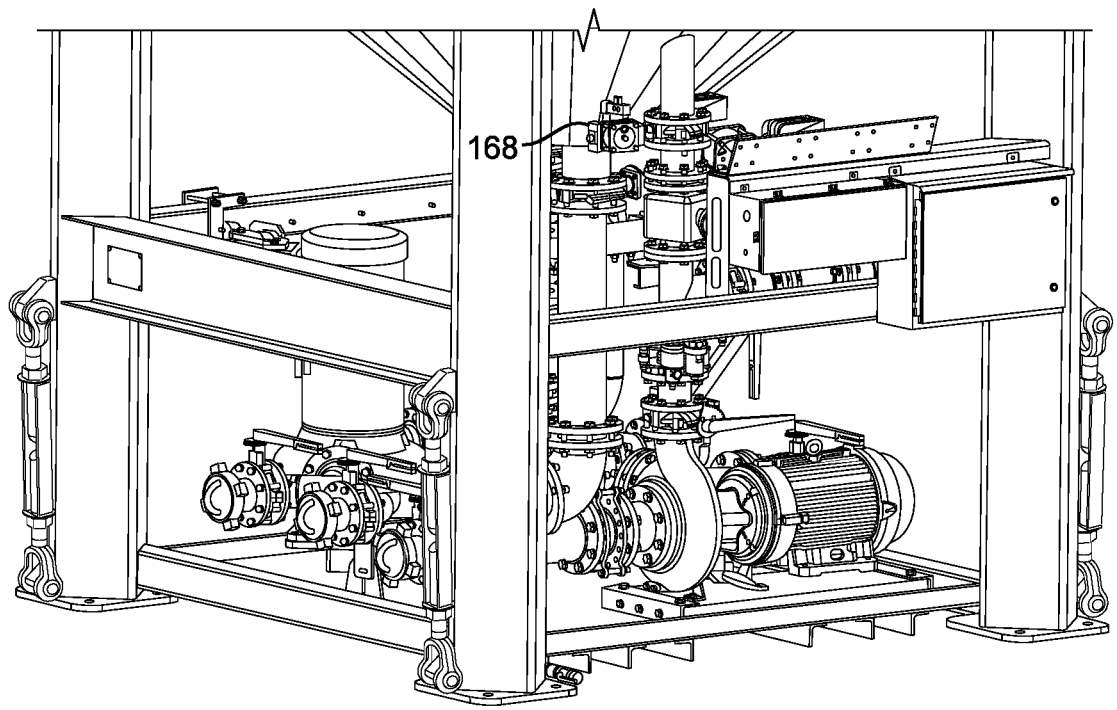

In addition, a high level communication system 155 will alert personnel in the area whenever an acid storage silo is approaching its capacity. Such precautions are designed to prevent overfilling the acid storage silo that could lead to the spilling and spraying of the acid solution from the top of the silo. FIGS. 4-6 illustrate one embodiment of a high level communication system 155 that includes a level monitor 157 in communication with a high level alarm, a high level switch 158, and an auto-shutoff valve 168 to close the inlet valve in the fill line 165 to prevent any additional acid solution from entering the tank 150.

A preferred embodiment of the level monitor used for determining the real-time level of the silo contents is a non-contact monitor that may be sonic, radar, or optical. For example, a non-contact radar level probe may be used to monitor the level of the acid in the tank 150 and to communicate its readings to the high level switch 158. Whenever the level of acid solution in the tank reaches a predetermined level, the communication system will close the auto-shutoff valve 168 and activate the alarm (sonic and/or visual) to notify all personnel within a prescribed area, Furthermore, the acid storage silo 150 may include an optional fume scrubber 170 to neutralize the corrosive fumes ventilated while the silo is being filled. One embodiment of the fume scrubber 170 as illustrated in FIG. 4 will be a small separate tank (approximately 100 to 300 gallons) installed atop the silo. The fume scrubber tank will store a neutralizing agent. For example, the fume scrubber tank may contain a sodium bicarbonate solution to neutralize hydrochloric acid fumes. The hydrochloric acid fumes pumped through a sodium bicarbonate solution produce a salt and carbon dioxide.

Figure 7:
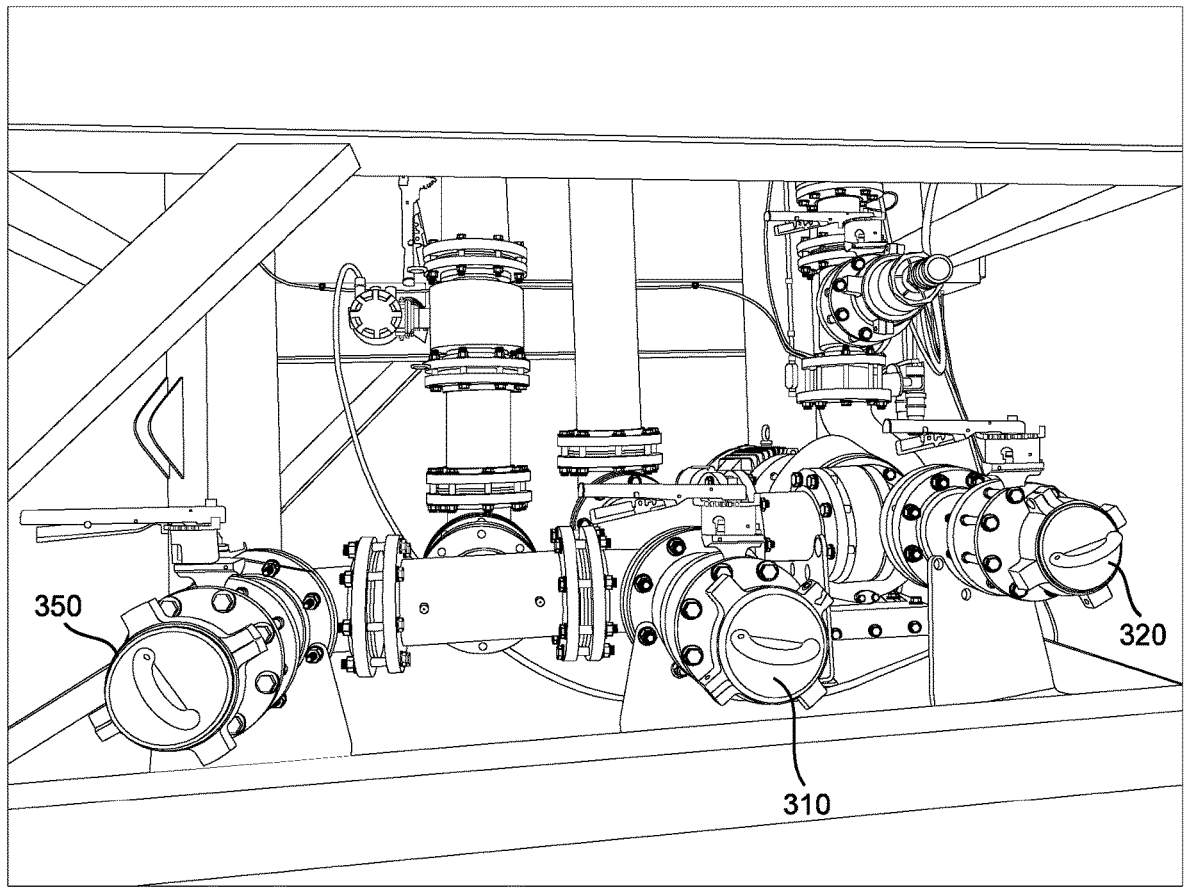

The acid storage silo 150 has a variety of connection lines. The acid storage silo typically comprises two process connections 310, 320 to connect the acid storage silo 150 to a blender suction line and another fill connection 350 used to connect to the fill line 165 whenever the acid storage silo is being filled. One embodiment of the process connections is illustrated in FIG. 7.

The Chemical Storage Silo

The chemical storage silo 200 is shown in FIGS. 1 and 2. The illustrated chemical storage silo has a tubular body with a set of legs 130 mounted on a bottom end of the chemical storage silo. The legs are attached to the platform 120 to stabilize the vertical positioning of the silo on the platform. Preferred embodiments of the chemical storage silo 200 will contain two chemical storage compartments 212, 214. Although each compartment 212, 214 may be any size, one embodiment of the chemical storage silo has two compartment of approximately equal size. Although the capacity of the storage compartments may vary, one embodiment has two chemical storage compartments 212, 214 with a capacity of 12,000 to 16,000 gallons each. Thus, the two chemical storage silos 200 illustrated in FIG. 1 can store up to four times the capacity of each storage compartment to provide bulk chemical storage at remote sites.

Figure 8A:
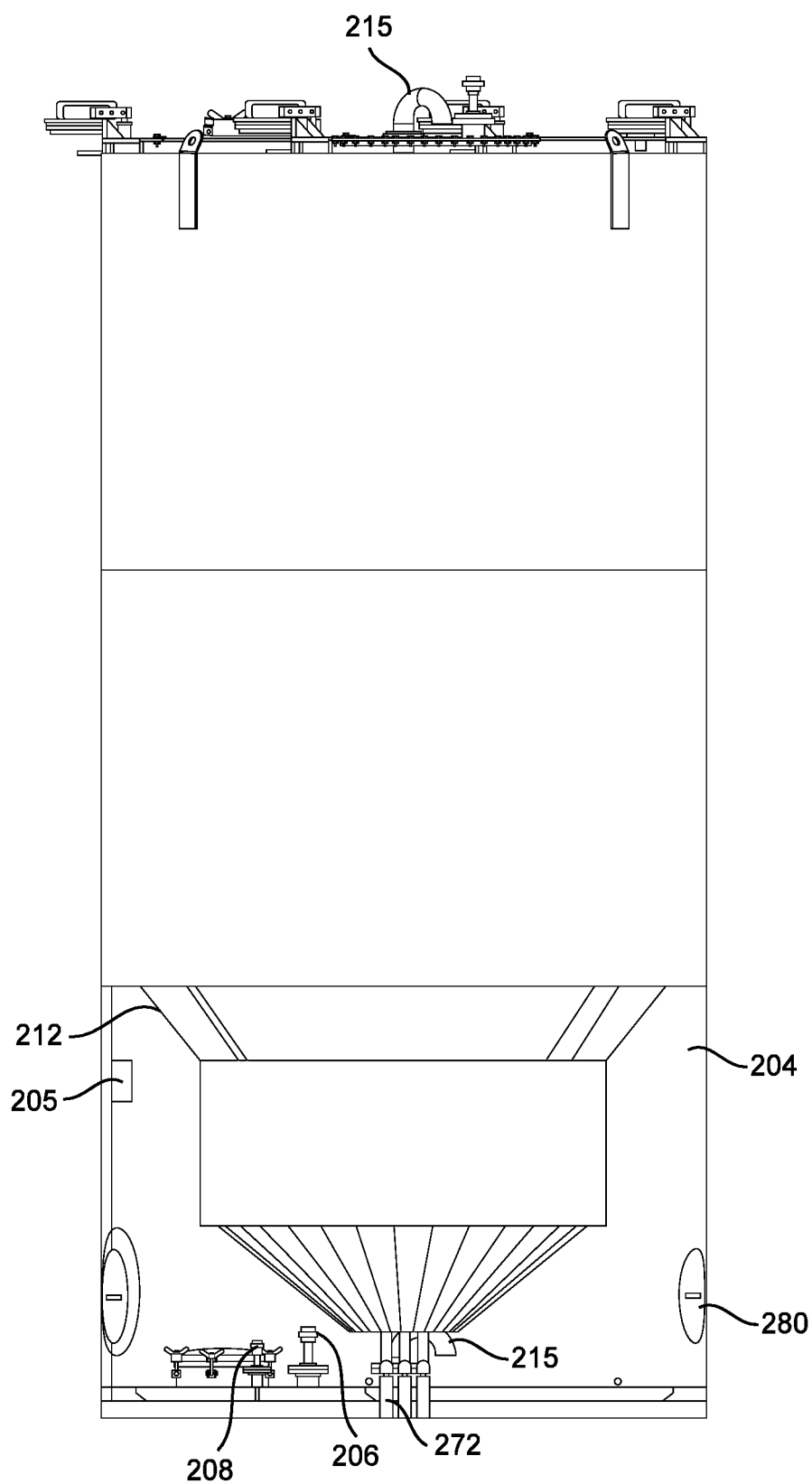
FIG. 8A depicts one embodiment of a space between the two compartments of a chemical storage container.
Figure 8B:
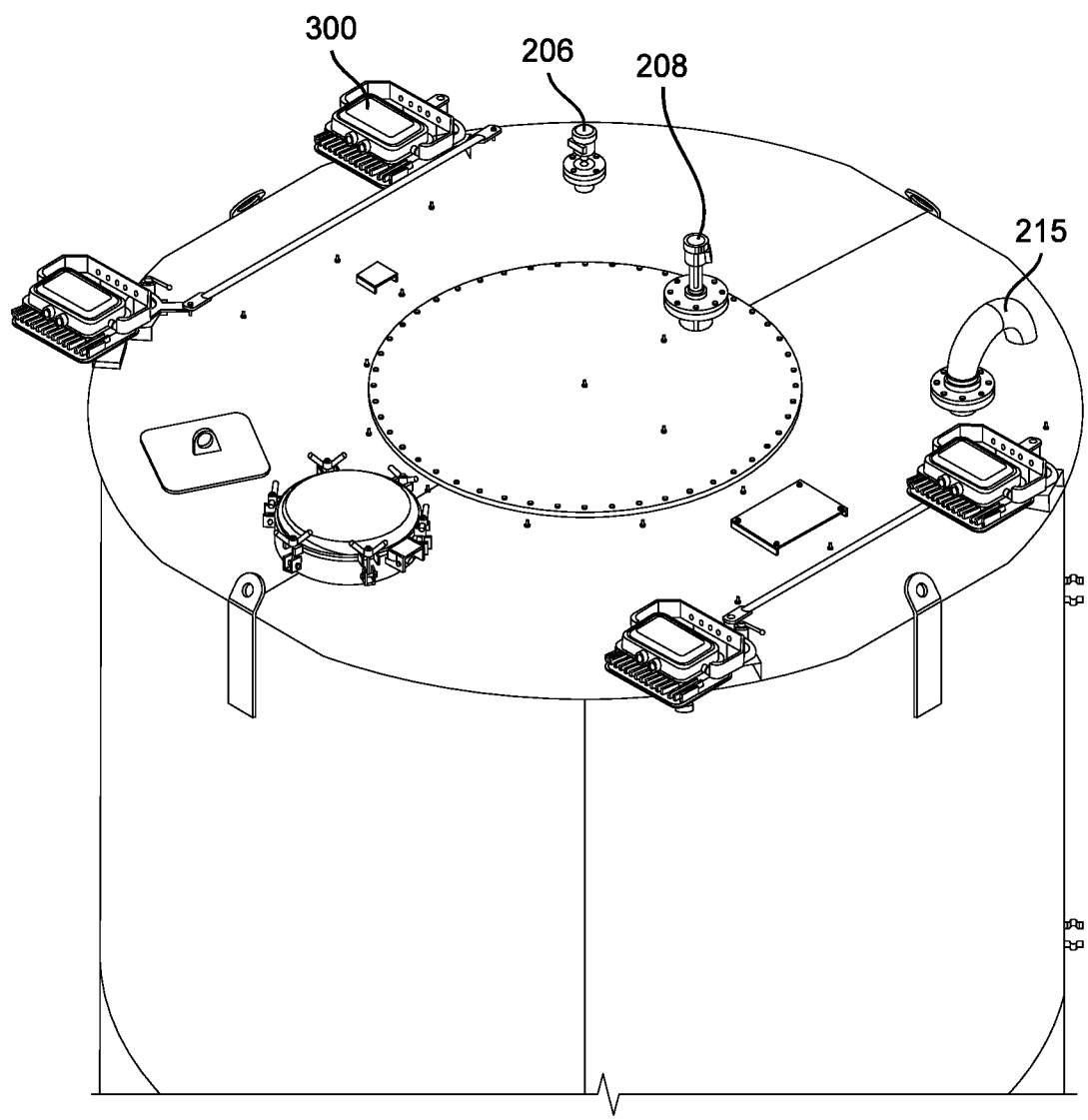
FIG. 8B depicts one embodiment of a top end of one embodiment of a chemical storage container.
Figure 8C:
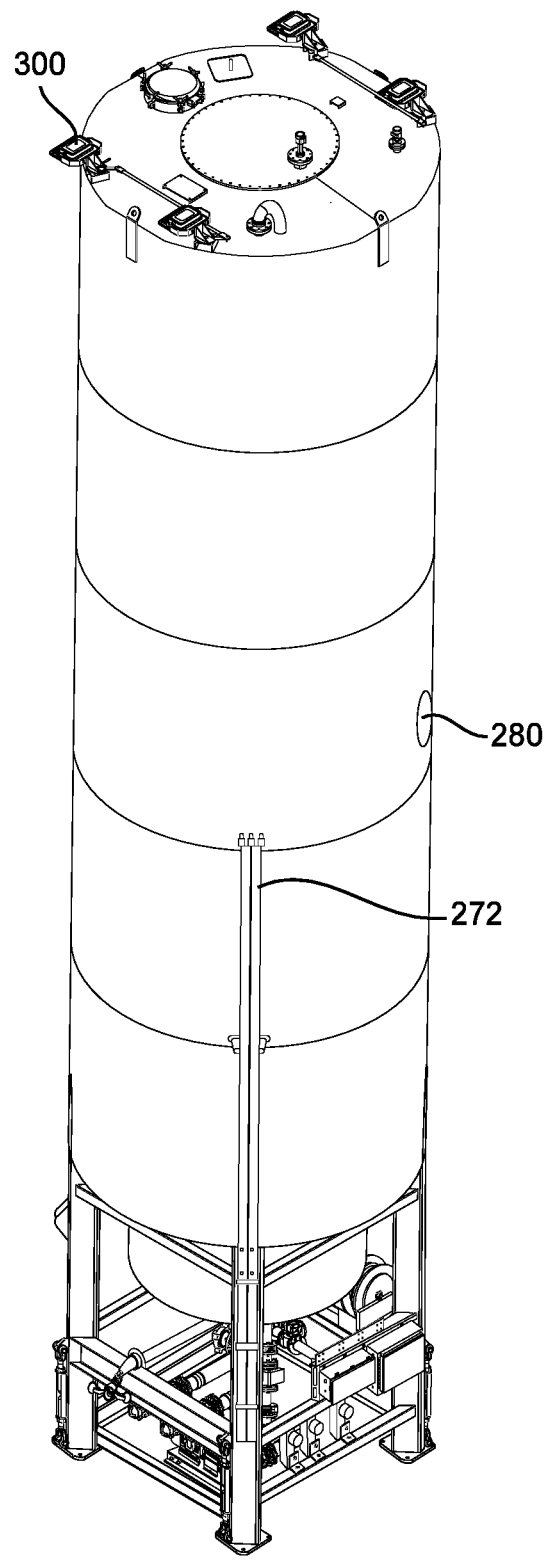
FIG. 8C is a side view of one embodiment of a chemical storage container.

The embodiment of the chemical silo 200 illustrated in FIG. 2 has a circular outer surface 202 and the two compartments 212 and 214 that are separated within the outer surface 202. Typically, there is an access opening 280 on opposed sides of the chemical silos that allow workmen to enter an area or space 204 between the two storage compartments 212 and 214 for maintenance purposes. An example of the space between the two compartments is shown in FIG. 8A.

Each compartment 212, 214 will typically include a recirculation system, a cleanup system, and a fill line in communication with a high level notification system. The piping 272 for each compartment will enter at the bottom of that compartment. The piping for the upper compartment 212 recirculation system, cleanup system, and fill line runs along the outside of the lower compartment 214 to enter the upper compartment from the bottom of the compartment.

Each compartment will also include a leak or vapor detection system 205 and an outlet to the blender. Each compartment 212, 214 will generally also have a vent 215 to allow volatile gases to vent to the atmosphere and relieve the pressure inside the compartment as the storage compartment is being filled. Each compartment will also have one or more pumps, flow meters, process connections, lighting and electrical components, and hose reels.

Typical chemicals that are stored in the chemical storage silo include clay control products, cross-linkers, corrosion inhibitors, biocides, surfactants, pH buffers, synthetic polyacrylamide friction reducer slurries, etc. Since the chemicals stored in the chemical storage compartments are often corrosive or reactive to certain metals and other material, the interior of the compartments, piping, flow meters, valves and other equipment that comes into contact with the stored chemicals will be manufactured from or lined with a chemical resistant material.

The chemicals stored in the storage compartments and sometimes a corrosion inhibitor will be dissolved, emulsified, or suspended in a chemical solution or slurry. To prevent any settling of any of the chemicals from the solution or slurry, each chemical storage compartment 112, 114 will be equipped with a recirculation pump and a recirculation line 220 that goes from the bottom of each chemical storage compartment towards the top of the compartment. Constant recirculation of the chemical solution, emulsion, or suspension is important to ensure keeping any solids or emulsions in an evenly distributed suspension. A preferred embodiment of the recirculation pump is capable of recirculating the contents of the entire compartment every hour.

Optionally the circulation system will include a temperature control means to maintain the stored chemical solution within a desired temperature range. The temperature control means may insulate the storage compartment and/or use a circulation heater in line with the circulation pump and/or the circulation line 220 to assist in maintaining the desired temperature stored chemical solution.

Figure 9:
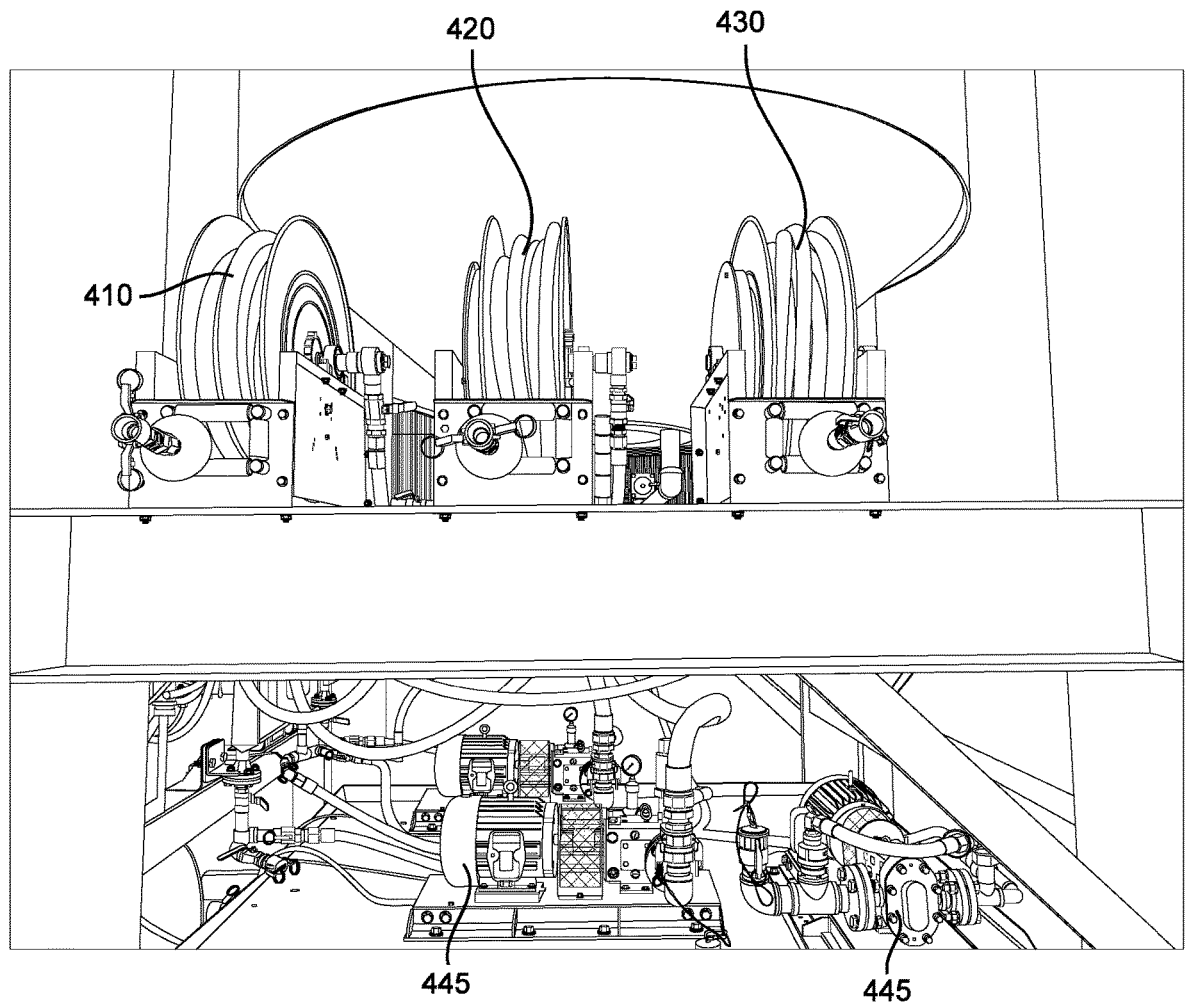

A leak detection system and a spill prevention system may also be used in conjunction with each chemical storage compartment. A leak detector device 205 (also commonly referred to as a lower explosive limit detector), such as a vapor detector for volatile chemicals, is typically installed at the bottom of each chemical storage compartment to detect any leaks that may develop in the chemical storage compartment as illustrated in FIGS. 8A and 9. The leak detector device is in communication with an alarm that will alert personnel in the area of a leak in the compartment.

Furthermore, each storage compartment will have a high level communication system to alert personnel in the area whenever a chemical storage compartment is approaching its capacity. Such precautions are designed to prevent overfilling the compartment that could lead to the overflow of the chemical from the top of the chemical storage compartment. The high level communication system will typically include a level monitor 206, a high level switch 208, a high level alarm, and an auto-shutoff valve to close the inlet valve to prevent any additional chemical from entering the compartment 212, 214.

The level monitor for determining the level of the compartment contents is preferably a non-contact monitor that may be sonic, radar, or optical. A preferred embodiment uses a non-contact radar level probe to monitor the level of the chemical in the compartment and to communicate its readings to the high level switch 208. Whenever the level of chemical in the compartment reaches a predetermined level, the communication system will close the auto-shutoff valve and activate the alarm (sonic and/or visual) to notify all personnel within the work area. Real time changes in the level of the chemical being stored in a particular compartment are recorded and can be used to verify the actual amount of chemical delivered to the site by a particular vendor.

Each chemical storage compartment 212, 214 has a compartment cleanout system to remove any residual chemical adhering to the interior of the compartment. Whenever a compartment is emptied and before new chemical is pumped into the compartment, the compartment is cleaned by pumping a cleanup solution or solvent through a cleanup line 235 and out through a spray nozzle 240 with enough force to disperse the cleanup solution to wash the entire inner surface of the compartment 212, 214. After the cleanup solution has been sprayed throughout the compartment interior, the cleanup solution is suctioned out of the compartment. A single washing of the compartment is generally sufficient, but a second washing of the compartment may be used to ensure that there are no trace chemicals left in the compartment.

The chemical storage silo 200 has a variety of connection lines 410, 420, 430 for providing the controlled pumping of each stored chemical (i.e., the two chemical storage compartment and one external source) from its storage compartment into the blender. The metered chemical output system to the blender will generally comprise three pumps 445, three flow meters, and three hose reels for connecting the two storage compartments and an external source chemical additive to a blender suction line.

The two chemical additive silos 200 will have a maximum capacity that varies from about 20,000 to 60,000 gallons, separated into two compartments 212, 214. In one embodiment, each compartment has a capacity of about 14,000 gallons, allowing for a total capacity of about 56,000 gallons.

Controlled Blending System at an Offsite Operation

Figure 10:
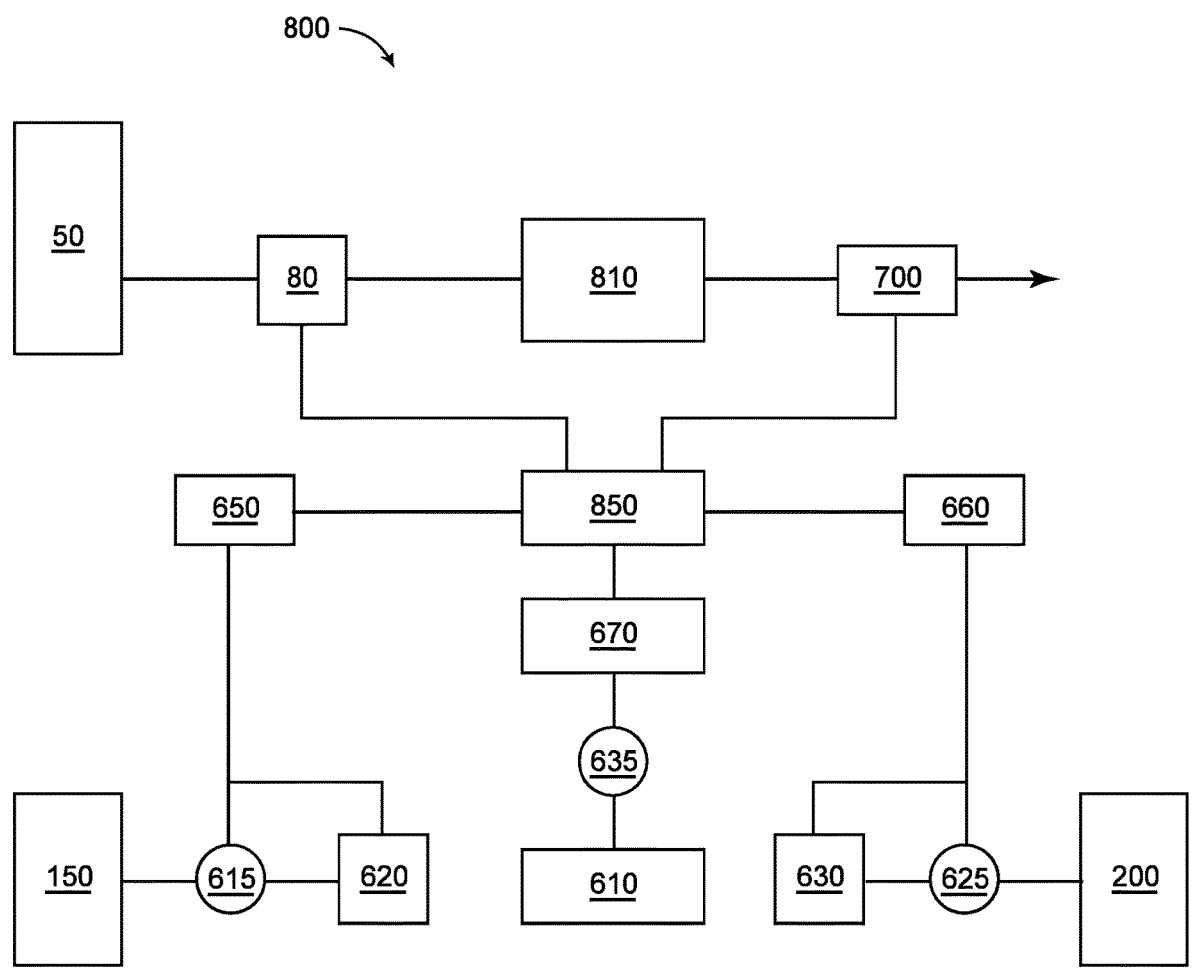
Figure 11:
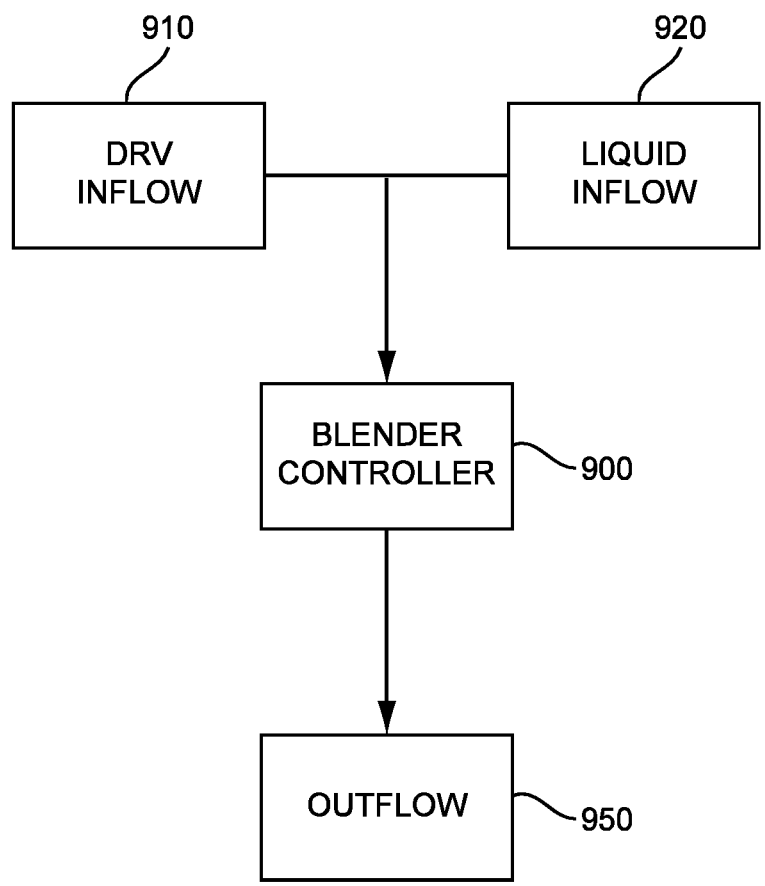

One embodiment of a controlled blending system 800 is schematically shown in FIGS. 10 and 11. The blending system 800 includes a granular storage container and/or a hopper 50 that blends various dry materials to be sent to a blender 810 for blending with liquid ingredients to form slurry.

A hopper dispenser 80 is regulated so as to provide exact outflow rates of solid material from the hopper 50 into the blender 810. The regulatable hopper dispenser 80 is used to measure, regulate and control the outflow of dry material 910 from the hopper the blender. One embodiment of the hopper dispenser 80 is an auger that can be regulated by a variable frequency drive (VFD) or other regulator. For example if an auger is used as the hopper dispenser, the outflow rate of material from the hopper is controlled by regulating the turn rate of the auger and thus the exact rate of outflow of material. The hopper dispenser 80 and its regulator are in communication with a programmable blender control system 850 also called the blender controller.

Liquid flow meters measure the exact inflow rate of one or more liquids into the blender 920. One embodiment of the blending system 800 uses a water supply meter 670 to measure the inflow of a water supply 610, a chemical composition flow meter 660 to measure the inflow of a chemical supply from a chemical silo, and an acid flow meter 670 to measure the inflow of an acid solution 650. The sum of the metered inflow of liquids into the blender 810 equals the total liquid inflow 920.

A programmable blender controller 900 is used to balance and control the inflow and outflow rates of material into and out of the blender. The entry rate of the fluid is measured by a blender fluid inflow meter or the sum of the measurements of inflow from a water supply 610, an acid storage container 150, and a chemical storage container 200. The rate of inflow of dry material 910 into the blender is calculated based on the entry rate of fluid 920 into the blender by a programmable controller 850 using a predetermined setpoint of solid/fluid ratio. The blender then blends the incoming granular material and fluid to form a fluid slurry, such as a fracking fluid slurry, that is used at the job site (e.g., pumped into a well). The outflow of the fluid slurry is monitored by a fluid slurry outflow meter 700. Thus, the blender controller 900 coordinates and balances the outflow of slurry 950 from the blender with the inflow of fluids 920 and dry granular materials 910 into the blender 810.

The overall coordination and control of the inflow and outflow of material into and out of the blender is important to the smooth operation of the controlled blending system 800 and is managed by a blender controller 850 as illustrated in FIG. 10. The blender controller 850 communicates with and controls the hopper dispenser 80 to control the rate of dry inflow into the blender. Similarly, the blender controller 850 communicates and controls the inflow of liquid by communicating with and controlling the pumps, controllers and flow meters associated with the water supply 710, the acid silos 150, and the chemical silos 200. For example, the outflow from the acid silo 150 is governed by an acid pump 615 which is regulated by an acid controller and the resulting acid solution being pumped into the blender 810 is measured by the acid flow meter 650; the outflow from the chemical silo 200 is governed by a chemical pump 625 which is regulated by a chemical controller 630 and the resulting chemical composition being pumped into the blender 810 is measured by the chemical flow meter 660; and the outflow from the water supply 610 is governed by a water pump 635 which is regulated by blender controller 850 and the resulting water supply being pumped into the blender 810 is measured by the water supply flow meter 670.

As shown in FIG. 10, the hopper outflow dispenser 80 delivers the dry materials directly from the hopper 50 into a blender 810 based on the liquid flow rate into the blender and the blender slurry flow rate exiting the blender. It is important that there is tight control over the exact amount of granular material entering the blender that is calculated based on the speed of the outflow dispenser 80 and the amount of dry material delivered per unit of time by the hopper outflow dispenser.

The blender controller 850 controls the speed of the hopper outflow dispenser based on the amount of granular material required to enter the blender per a designated time period. The entry rate of granular material into the blender is controlled to match the entry rate of fluid into the blender based on a predetermined setpoint of solid/fluid ratio. The entry rate of fluid into the blender 810 is typically controlled by one or more pumps and measured by fluid flow meters.

Once the dry material and fluid enter the blender 810, the blender blends the granular material and fluid to form a fluid slurry. The blending process is typically performed by a mixing process that is designed to quickly and thoroughly mix the contents of the blender into a homogenous fluid slurry. The exit rate for the fluid slurry is controlled by a discharge pump and is measured by the blender slurry flow meter 700 and is balanced with the inflow of the dry material and fluid into the blender.

The foregoing provides a detailed description of the invention which forms the subject of the claims of the invention. It should be appreciated by those skilled in the art that the general design and the specific embodiments disclosed might be readily utilized as a basis for modifying or redesigning a chemical and acid storage system to perform equivalent functions, but those skilled in the art should realized that such equivalent constructions do not depart from the spirit and scope of the invention as set forth in the appended claims.

What is claimed is:

1. A chemical storage system comprising:
   (a) an acid storage silo having an attached fume scrubber tank, wherein a volume of acidic solution stored in the acid storage silo is in fluid communication with a recirculation pump;
   (b) a chemical storage silo having a divider that divides the chemical storage silo into an upper compartment and a lower compartment, wherein the divider comprises:
      a substantially conical or frustoconical base that at least partially defines a lower portion of the upper compartment; and
      a substantially horizontal plate positioned below the substantially conical or frustoconical base, wherein a side of the chemical silo defines an access opening into an access volume that is defined between the substantially conical or frustoconical base and the substantially horizontal plate, and wherein each compartment has a chemical level monitor, a fill line, and a cleanup system; and
   (c) a platform, wherein the acid storage silo and the chemical silo are vertically attached to the platform.

2. The chemical storage system of claim 1, wherein the acid storage silo has a recirculation line that goes from a bottom end of the acid silo toward a top end of the acid silo.

3. The chemical storage system of claim 1, wherein the fume scrubber tank is positioned above the acid storage silo, wherein the fume scrubber tank stores a neutralizing solution, and wherein fumes from the acidic solution flow through the fume scrubber tank and are neutralized by the neutralizing solution therein.

4. The chemical storage system of claim 1, wherein the acid storage silo includes a high level communication system, wherein the high level communication system comprises:
   a level monitor configured to measure a level of the acidic solution in the acid storage silo;
   a level alarm configured to generate an alert when the level exceeds a predetermined level; and
   an auto-shutoff valve configured to close an inlet valve to prevent additional acidic solution from entering the acid storage silo.

5. The chemical storage system of claim 1, wherein each chemical storage compartment has a recirculation pump.

6. The chemical storage system of claim 1, wherein each compartment has a leak detection system.

7. A storage and blending system comprising:
   (a) a blender;
   (b) a blender controller, wherein the blender controller balances an inflow of liquids and granular materials into the blender with an outflow of slurry from the blender;
   (c) an acid storage silo having an acid level monitor and an attached fume scrubber tank, wherein a volume of acidic solution stored in the acid storage silo is in fluid communication with a recirculation pump;
   (d) a vapor detector positioned proximate to a lower end of the acid storage silo, wherein the vapor detector is configured to detect leaks of the acidic solution;

(e) a chemical storage silo having a divider that divides the chemical storage silo into an upper compartment and a lower compartment, wherein the divider comprises:
- a substantially conical or frustoconical base that at least partially defines a lower portion of the upper compartment; and
- a substantially horizontal plate positioned below the substantially conical or frustoconical base, wherein a side of the chemical silo defines an access opening into an access volume that is defined between the substantially conical or frustoconical base and the substantially horizontal plate, and wherein each compartment has a chemical level monitor, a fill line, and a cleanup system; and (f) a platform, wherein the acid storage silo and the chemical silo are vertically attached to the platform.

8. The chemical storage system of claim 1, wherein the substantially horizontal plate defines a manhole provides access from the access volume into the lower interior volume.

9. The chemical storage system of claim 1, further comprising a vent pipe that extends from within the lower compartment up into the access volume to relieve a pressure inside the lower compartment as the lower compartment is being filled.

* * * * *